United States Patent [19]

Waldmann

[11] Patent Number: 4,566,986

[45] Date of Patent: Jan. 28, 1986

[54] FLOCCULATING AGENTS AND PROCESSES FOR MAKING THEM

[76] Inventor: John J. Waldmann, 2129 Knickerbocker Dr., Charlotte, N.C. 28212

[21] Appl. No.: 646,012

[22] Filed: Aug. 31, 1984

[51] Int. Cl.$^4$ .......................... C02F 5/08; C01F 7/16; C01F 7/74

[52] U.S. Cl. .................................. 252/175; 210/716; 210/723; 423/463; 423/556; 423/600; 423/625; 423/626; 423/629

[58] Field of Search ................. 252/175; 210/716, 723; 423/463, 556, 600, 625, 626, 629

[56] References Cited

U.S. PATENT DOCUMENTS

| | | | |
|---|---|---|---|
| 2,217,466 | 10/1940 | Baylis | 252/175 |
| 2,326,395 | 8/1943 | Samuel | 210/723 |
| 2,567,285 | 9/1951 | Hay | 252/175 |
| 2,858,269 | 10/1958 | Harwood et al. | 210/702 |
| 2,923,660 | 2/1960 | Hallmann | 423/600 |
| 3,345,302 | 10/1967 | Netting | 252/181 |
| 3,497,459 | 2/1970 | Nakamura et al. | 252/175 |
| 3,544,476 | 12/1970 | Aiba et al. | 252/175 |
| 3,879,525 | 4/1975 | Miyata et al. | 423/600 |
| 3,929,666 | 12/1975 | Aiba et al. | 252/175 |
| 4,034,067 | 7/1977 | Seigneurin et al. | 423/462 |
| 4,051,028 | 9/1977 | Fiessinger | 252/175 |
| 4,131,545 | 12/1978 | Redmayne et al. | 252/175 |
| 4,131,546 | 12/1978 | Olsson et al. | 210/771 |
| 4,284,611 | 8/1981 | Gancy et al. | 423/556 |
| 4,362,643 | 12/1982 | Kuo et al. | 252/175 |

FOREIGN PATENT DOCUMENTS 49-058885 1/1974 Japan .
53-77899 7/1978 Japan .

*Primary Examiner*—Paul Lieberman
*Assistant Examiner*—Robert A. Wax
*Attorney, Agent, or Firm*—Ralph H. Dougherty

[57] ABSTRACT

The present invention is directed to a new and useful group of calcium, zinc and magnesium flocculating agents which may be beneficially utilized to treat and purify waste water and/or other waste liquids resulting from a variety of industrial processes. The general ion free formula of these inorganic flocculating agents is represented as follows:

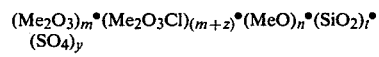

$(Me_2O_3)_m \bullet (Me_2O_3Cl)_{(m+z)} \bullet (MeO)_n \bullet (SiO_2)_t \bullet (SO_4)_y$ These flocculating agents may also be represented by the theoretical formula of:

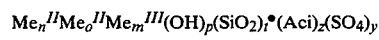

$Me_n{}^{II} Me_o{}^{II} Me_m{}^{III} (OH)_p (SiO_2)_t \bullet (Aci)_z (SO_4)_y$ where:
(a) $Me_n{}^{II}$ is selected from the divalent cationic group consisting of: (1) $Ca^{2+}$, (2) $Mg^{2+}$ and (3) $Ca^{2+}$ and $Mg^{2+}$;
(b) $Me_o{}^{II}$ is divalent cationic $Fe^{2+}$;
(c) $Me_m{}^{III}$ is selected form the trivalent cationic group consisting of: (1) $Al^{3+}$, (2) $Fe^{3+}$ and (3) $Al^{3+}$ and $Fe^{3+}$;
(d) Aci is selected from the monovalent anionic group consisting of: (1) $Cl^-$, (2) $Br^-$, (3) $I^-$, (4) $NO_3^-$, (5) $CH_3COO^-$ and (6) two or more of $Cl^-$, $Br^-$, $I^-$, $NO_3^-$ and $CH_3COO^-$ (preferably Aci is $Cl^-$);
(e) n=1 to 5;
(f) o=0 to 10;
(g) m=1 to 15;
(h) p=1 to 15;
(i) z=0 to 15;
(j) y=0 to 15; and
(k) t=0 to 15.

Processes for manufacturing flocculating agents belonging to this group of materials are also revealed.

21 Claims, No Drawings

FLOCCULATING AGENTS AND PROCESSES FOR MAKING THEM

FIELD OF THE PRESENT INVENTION

The present invention is directed to new and useful inorganic flocculating agents (adducts) which may be used to purify water or other industrial liquids. The areas to which the improved flocculating adducts may be applied are virtually limitless. However, for exemplary purposes only, a partial listing of the areas would include, at the least, (1) waste water from dye manufacturing and dyeing operations, (2) waste water from paper and pulp manufacturing operations, (3) waste water from meat processing operations, (4) waste water from starch, paint, oil and fat processing operations, (5) waste water from metal processing operations, (6) waste water from wool scouring operations, (7) waste water from sewage treatment, (8) waste water from sludge treatment, (9) waste water from textile manufacturing and processing operations, (10) waste water from sugar refining operations, (11) waste water from coal treating operations, (12) waste water from soap manufacturing operations, (13) waste water from corn starch manufacturing operations, (14) waste water from hydroelectric plants and atomic energy plants, (15) waste water from petroleum operations, (16) waste water from chemical and pharmaceutical manufacturing and processing operations, (17) waste water from mining operations, (18) waste water from tanning operations, (19) waste water from construction operations, (20) waste water from cosmetic manufacturing operations and (21) waste water from agricultural operations.

BACKGROUND OF THE INVENTION

The term industrial waste is generally understood to refer specifically to the liquid waste produced as a result of some industrial operation, as distinct from an industry's solid refuse or its gases, fumes and vapors. Like municipal sanitary sewage, most of such liquids must ultimately be disposed of into rivers or other water courses. The liquid wastes of a community, with domestic sewage or industrial wastes, should receive appropriate treatment before discharge into streams in order to prevent gross pollution. The treatment methods for domestic sewage are based on a fundamental and growing body of knowledge. These methods, however, are not suitable for all industrial wastes, which are quite varied in character. Frequently, a new industrial process will produce a waste that is not amenable to treatment by any of the then existing conventional methods. For such new wastes, laboratory investigations followed by pilot-plant studies must precede final design of a method of treatment and the materials thereby utilized.

A number of chemicals will combine with water or the constituents present therein to produce flock, a gelatinous precipitate which aids considerably in clarification of the water during sedimentation. During formation and settling of the flock many of the finely divided particles, including microorganisms, are collected and some of the dissolved substances, particularly those that impart color, are absorbed. The use of flocculating agents is believed to have been originally intended as a pretreatment before utilization of rapid sand filters. However, the good results obtained have led to their use in sedimentation procedures which will not be followed by filtration. Of the various chemicals that can be used for this purpose, aluminum sulfate, commonly called "alum" is employed quite extensively. Ferric salts are conventionally accepted substitutes, especially if the pH of the water is not suitable for alum flocculation. These trivalent cations are very effective in precipitating negative colloids. Both aluminum and iron form gelatinous percipitates in slightly alkaline solutions and the extent to which these added salts participate in the precipitation depends, to a large extent, upon the pH of the water. Since the amount of precipitate and the efficiency of removal of suspended matter by these conventional materials are dependent upon a favorable pH it is often possible to improve the effectiveness of the alum treatment by a prior adjustment of pH. In most cases such adjustments are necessary when there is insufficient alkalinity.

The amount of alum required for proper clarification and color removal is dependant upon the character of the water, the methods of handling, and length of sedimentation to be used. The amount needed in any given situation has to be determined by experimentation.

Unfortunately, it is known that the sludge or flock created by conventionally used salts such as (a) ferric chloride [$FeCl_3$], (b) ferric sulfate [$Fe_2(SO_4)_3$ or $Fe_2(SO_4).9H_2O$], (c) aluminum sulfate (alum) [$Al_2(SO_4)_3$ or $Al_2(SO_4)_3.18H_2O$], (d) aluminum chloride [$AlCl_3$], (e) sodium aluminate [$Na_2Al_2O_4$ or $NaAlO_2$] or (f) ferrochlorosulfate [$ClSO_4Fe$] possess substantial swelling properties and retain large amounts of water. This retention of water has considerable adverse economic impact on the water purification process and any process which further includes the incineration of the sludge or flock created therefrom since materials retaining large amounts of water will be more difficult to remove from solution by filtration and are not readily incinerated. Moreover these conventional flocculants do not perform well in combination with other chemical treatments of waste water since their efficiency is effected by the pH of the water, the chemical composition of the water (including other treatment additives) and the water temperature.

Another problem which is associated with many of the presently used conventional water purification flocculating materials and, in particular, the basic metal salts of aluminum chloride or aluminum sulfate is that these materials are not entirely stable and tend to produce hydroxide precipitate which has drastically reduced coagulating or flocculating properties. Additionally, the manufacture of these conventional materials is somewhat complicated and difficult to carry out on a large scale industrial basis. For example, production of basic aluminum chloride or basic aluminum sulfate generally requires long reaction times (10 to 18 hours) sophisticated chemical systems which may be uneconomical, filtration and/or neutralization operations. Yet another problem associated with most of the basic aluminum salts is that they cannot be readily diluted because such action would result in hydrolytic reactions which tend to deactivate the flocculating properties of the product through formation of hydroxide precipitate. Various attempts to improve the stability and coagulation properties of these basic aluminum compounds through utilization of new technologies have been undertaken. One such improvement is by incorporating iron into the structure of the basic molecule. The technology involved is quite sophisticated and requires special equipment and involves long reaction times (from 50 to 150 hours) under pressure. This technology presently appears to have more theoretical meaning than practical utility.

Another attempt in improving the stability and flocculating properties of basic aluminum sulfate has been directed to reacting aluminum sulfate with phosphoric acid. This procedure has strong drawbacks in that the presence of phosphorus in the chemical structure of the material could have a negative impact on the environment and the quality of water in which the material is used. An even further problem which has been associated with these conventional flocculating agents is that they are not very stable in time and generally hydrolyze to their metal hydroxide precipitates which, usually, are no longer active as coagulating agents.

While aluminum has no redox or sulfide chemistry comparable to iron, its amphoterism and solubility impose definite limitations on aluminum sulfate usage. In particular, the solubility of the predominant equilibrium species when aluminum sulfate is utilized, $Al(OH)_4^-$, is greatly dependent upon pH. In more acidic solutions, having pHs of less than 3, the equilibrium concentration of this ionic species is lower. Accordingly, the optimal pH range for utilization of aluminum sulfate is from about 5.5 to about 6.5.

A problem associated with the production of conventional aluminum chloride, in the form of aluminumhydroxychloride, is that commercial production of this material is only accomplished under difficult processing conditions. For example, those processes presently known involve reaction times of between about 15 and 22 hours and utilization of aluminum oxide particles having specific sizes. Furthermore the reaction temperature of about 105° C. must be followed by the steps of filtration, concentration and passage of material through a IR-45 amberlite anion exchange resin.

Another known flocculating material which is available on a commercial scale is believed to be produced in Japan and marketed under the tradename "TAKI-PACS". This material is believed to be a polyaluminum-chloride sulfate flocculating material. The material is believed to have the following general composition:

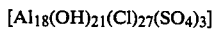

$[Al_{18}(OH)_{21}(Cl)_{27}(SO_4)_3]$

This product is believed to be made in accordance with the following chemical reaction:

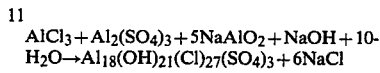

11
$AlCl_3 + Al_2(SO_4)_3 + 5NaAlO_2 + NaOH + 10-H_2O \rightarrow Al_{18}(OH)_{21}(Cl)_{27}(SO_4)_3 + 6NaCl$ The sodium chloride is believed to be a stabilizer. Unfortunately, this product is not stable in time and is easily hydrolyzed to aluminum hydroxide and its associated salt. The resulting materials have extremely reduced or no flocculating properties.

In order to accomplish efficient destabilization (flocculation) of waste water colloidal suspensions while utilizing salts of iron or aluminum one must recognize that the properties of these flocculating materials are highly dependent upon zeta potential-pH relationships and ongoing hydrolytic reations. For example, since the isoelectric point of ferric hydroxide generally coincides with the general region of minimum stability of colloidal waste water solutions, its utilization generally yields a hydrolyzed primary flocculant having a desireable zeta potential. Unfortunately, in many situations, it is difficult to make use of this desirable situation because of the presence of sulfides or other strongly reducing agents in the solution to be treated. The presence of these materials causes reduction of the ferric ion to the ferrous ion and formation of mixture iron sulfides which generally do not have satisfactory flocculation properties. As a matter of fact these materials may contribute to stabilizing the colloidal suspension rather than destabilizing it. In response to this problem the new flocculating adducts of the present invention shift the zeta potential and the zeta potential-pH relationship to a region where the iron material is a good coagulant. A further advantage of the flocculating adducts of the present invention is that the aluminum and/or iron are not in the hydrate form. The hydrate form carries a negative charge which adversely affects water treatment processes because, as is generally known, waste water colloids are generally negatively charged.

The materials in the present invention were developed in response to the need for improved flocculating materials having greater stability, improved dilution capabilities and an ability to work satisfactorily in a wide range of pHs. Accordingly, I have found that the magnesium or calcium flocculating adducts of the present invention, when made in a highly concentrated form by way of a semi-solid state reaction, have a high trapped cationic charge which may be generally expressed as $Me^{3+} \rightarrow Me^{2+} \rightarrow Me(OH)^+$. This form decreases dissociation of aluminum or iron particles carrying a high positive charge as opposed to the hydrate form carrying a negative charge.

The compounds of the present invention cause rapid flocculation and also reinforce the formation of aggregates of particles which generally results in the tightening or bonding together of the particles and an increased rate of flocculation and settling. The supernatant formed therefrom is less turbid and quite clear. Additionally, less sludge is produced. As was stated above, the products of the present invention are more stable than presently known conventional products which have a tendency to hydrolyze and form hydroxide precipitate and associated salts. The presence of magnesium in the flocculating agents of the present invention is believed to be responsible for their increased stability and resultant increased shelf life.

OBJECTS OF THE PRESENT INVENTION

According, it is generally an object of the present invention to provide a group of new and useful inorganic flocculating agents.

It is another object of the present invention to provide processes for the manufacture of the flocculating agents defined herein.

Yet another object of the present invention is to provide a group of inorganic flocculating agents adapted to purify or treat waste water or other industrial liquids at temperatures ranging from about room temperature to about 125° C.

Another object of the present invention is to provide a new and useful group of inorganic flocculating agents the use of which results in a low sludge (flock) volume. Typically, the sludge volume resulting from use of the flocculating agents of the present invention is generally about 30% to about 50% of the sludge volume obtained when utilizing conventional presently known and commonly used flocculating agents or coagulants.

An even further object of the present invention is to provide a new and improved group of inorganic flocculating agents the utilization of which results in a lower percentage of water being entrapped in the sludge or flock created.

Still another object of the present invention is to provide a new and useful group of inorganic flocculating agents the utilization of which results in a sludge or flock which may be readily and rapidly filtered out of water or other relevant industrial waste liquids.

One other object of the present invention is to provide a group of new and useful inorganic flocculating agents which are highly efficient at removing metals, phosphorus and flouride from a treated liquid, even at a high alkaline pH.

Still one other object of the present invention is to provide a new and useful group of inorganic flocculating agents which lower the biological oxygen demand (BOD) and the chemical oxygen demand (COD) of the treated liquid during treatment.

Yet even another object of the present invention is to provide a new and useful group of inorganic flocculating agents the use of which results in the formation of very compact sludge or flock.

One other object of the present invention is to provide a new and useful group of inorganic flocculating agents the use of which results in a dense sludge or flock which settles quickly from the treated liquid and is readily handled by rotary filters.

An even further object of the present invention is to provide a new and useful group of inorganic flocculating agents which can be diluted with water, [$H_2O$], alkylglycols, hydrols, sulfuric acid [$H_2SO_4$], hydrochloric acid [HCl in an aqueous solution], nitric acid [$HNO_3$], sulfamic acid [$HSO_3NH_2$], phosphoric acid [$H_3PO_4$], hydroxyacetic acid [$CH_2OHCOOH$], fuming sulfuric acid [$nH_2SO_4.ySO_3$], or a mixture of two or more of these materials.

Still further objects and the broad scope of applicability of the present invention will become apparent to those of ordinary skill in the art from the details disclosed hereinafter. However, it should be understood that the following detailed description which indicates several preferred embodiments of the present invention is given only for purposes of illustration since various changes and modifications well within the scope of the present invention will become apparent to those of ordinary skill in the art in view of the detailed description.

SUMMARY OF THE INVENTION

The present invention is directed to a group of new and useful inorganic flocculating agents which may be used to purify industrial waste water and/or other industrial waste liquids, as appropriate. The flocculants are represented by the following general expression.

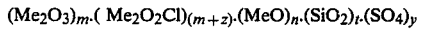

$(Me_2O_3)_m \cdot (Me_2O_2Cl)_{(m+z)} \cdot (MeO)_n \cdot (SiO_2)_t \cdot (SO_4)_y$ These flocculating materials are believed to be represented by the theoretical structural formula of:

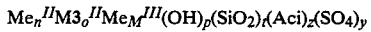

$Me_n{}^{II}M3_o{}^{II}Me_M{}^{III}(OH)_p(SiO_2)_t(Aci)_z(SO_4)_y$ where:
MeII$_n{}^{II}$ is selected from the divalent cationic group of
(a) $Ca^{2+}$, (b) $Mg^{2+}$, (c) $Ca^{2+}$ and $Mg^{2+}$ and (d) $Zn^{+2}$, where n=1 to 5;
MeII$_o{}^{II}$ is divalent cationic $Fe^{2+}$ and o=0 to 10;

Me$_m{}^{III}$ is selected from the trivalent cationic group of
(a) $Al^{3+}$, (b) $Fe^{3+}$ and (c) $Al^{3+}$ and $Fe^{3+}$; and m=1 to 15;
Aci is selected from the monovalent anionic group of
(a) $Cl^-$, (b) $Br^-$, (c) $I^-$, $NO_3^-$, (e) $CH_3COO^-$ and (f) two or more of $Cl^-$, $Br^-$, $I^-$, $NO_3^-$, $CH_3COO^-$ (preferably Aci is $Cl^-$); and
p=1 to 15, z=0 to 15, y=0 to 15 and t=0 to 15.

The present invention is also directed to processes for manufacturing flocculating agents or adducts belonging to the above-identified group. Generally speaking, the reaction processes may be carried out within the temperature range of from about room temperature to about 110° C., preferably from about 50° C. to about 110° C., even more preferably from about 100° C. to about 110° C. Most preferably at about 105° C. Additionally, the reaction processes for forming the flocculating adducts may be carried out from about 1 atmospheric pressure to about 120 pounds per square inch. If a pressure reaction is desired, the pressure range is preferably from about 10 pounds per square inch to about 100 pounds per square inch, even more preferably from about 15 pounds per square inch to about 100 pounds per square inch.

The flocculating adducts of the present invention are generally prepared, in accordance with the present invention, by way of a semi-solid state reaction is concentrated solution form by adding from about 0.5 mole percent to about 12.0 mole percent of a material selected from the group of: (1) iron sulfates [ferrous sulfate $Fe_2SO_4.7H_2O$ or ferric sulfate $Fe_2(SO_4)_3$ or $Fe_2(SO_4)_3.9H_2O$]; (2) iron chlorides [ferrous chloride $FeCl_2$ or $FeCl_2.4H_2O$ or ferric chloride $FeCl_3$ (anhydrous) or $FeCl_3.6H_2O$ (hydrate)]; (3) aluminum sulfate [$Al_2(SO_4)_3$ or $Al_2(SO_4)_3.18H_2O$]; (4) aluminum chloride [$AlCl_3$ (anhydrous) or $AlCl_3.6H_2O$ (hydrate)]; (5) aluminum oxide hydrate [$Al_2O_3.nH_2O$ where n=0.5 to 2.97]; alumina trihydrate [$Al_2O_3.H_2O$] from 10 mole percent to 70 mole percent; or (6) a mixture of one or more of the above aluminum sulfates, aluminum chlorides, iron sulfates and/or iron chlorides to an acidic medium. Preferably, the acidic medium comprises a blend of from about 10 to about 40 mole percent of hydrochloric acid [aqueous HCl] (20 baume) and about 10 to about 45 mole percent hydrochloric acid [aqueous HCl] (22 baume).

Thereafter, from about 0.025 mole percent to about 6.0 mole percent of a material selected from the group: (1) magnesium hydroxide [$Mg(OH)_2$]; (2) magnesium oxide [MgO]; (3) basic magnesium carbonate [$Mg(OH)_2.3MgCO_3.3H_2O$]; (4) magnesium chloride [$MgCl_2$ or $MgCl_2.6H_2O$]; (5) calcium carbonate [$CaCO_3$] is added to the solution.

Optionally, the reaction process may take place in the presence of from about 0.02 mole percent to about 7 mole percent, preferably from about 0.02 to about 5.0 mole percent, of one or more catalysts and/or stabilizing agents selected from the group of: (1) sulfuric acid [$H_2SO_4$]; (2) phosphoric acid [$H_3PO_4$]; (3) phosphorous acid [ortho $H_3PO_3$]; (4) hydrogen sulfide [$H_2S$]; (5) sodium hypochlorite [NaOCl]; (6) silanols [$H_3SiOH$, $H_2Si(OH)_2$, etc.]; (7) sodium sulfite [$Na_2SO_3$]; (8) sodium acid sulfite [$NaHSO_3$]; (9) dibasic sodium phosphate [$Na_2HPO_4$]; (10) monobasic sodium phosphate [$NaH_2PO_4$] and (11) natural polymers such as, for example, sucrose, dextrose or glucose.

The products of the present invention are generally stable for quite a long time and, accordingly, do not gel or form aluminum hydroxide or associated salts which are not water soluble and are not useful as flocculating materials.

Throughout this specification and claims, the term "mole percent" shall refer to the aqueous material, not to the material before water is added.

DETAILED DESCRIPTION OF THE INVENTION AND PRESENTLY PREFERRED EMBODIMENTS

The present invention is directed to a group of flocculating adducts having the following general formula:

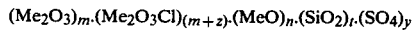

$$(Me_2O_3)_m \cdot (Me_2O_3Cl)_{(m+z)} \cdot (MeO)_n \cdot (SiO_2)_t \cdot (SO_4)_y$$

This group of flocculating adducts may be further defined by the theoretical formula of:

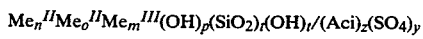

$$Me_n^{II} Me_o^{II} Me_m^{III}(OH)_p(SiO_2)_t(OH)_t/(Aci)_z(SO_4)_y$$

where:
(1) $Me_n^{II}$ is selected from the divalent cationic group of (a) $Mg^{2+}$, (b) $Ca^{2+}$, or (c) $Mg^{2+}$ and and $Ca^{2+}$ and $n=1$ to 5;
(2) $Me_o^{II}$ is divalent cationic $Fe^{2+}$ and $o=0$ to 10;
(3) $Me_m^{III}$ is selected from the trivalent cationic group of (a) $Al^{3+}$, (b) $Fe^{3+}$, and (c) $Al^{3+}$ and $Fe^{3+}$; and $m=1$ to 15;
(4) Aci is selected from the monovalent anionic group of (a) $Cl^-$, (b) $Br^-$, (c) $I^-$, (d) $NO_3^-$, (e) $CH_3COO^-$ and (f) mixtrues of two or more of $Cl^-$, $Br^-$, $I^-$, $NO_3^-$ and $CH_3COO^-$ (preferably Aci is $Cl^-$);
(5) $p=1$ to 15;
(6) $z=0$ to 15;
(7) $y=0$ to 15; and
(8) $t=0$ to 15.

Exemplary non-limiting materials included within included within this group and disclosed within this application include (a) polyhydroxyaluminum magnesium sulfate, generally defined by the formula of: $[Al_4MgO(OH)_5(SO_4)_{3.5}]$; (b) polyhydroxyaluminum magnesium chloride, generally defined by the formula of: $[Al_3Mg(OH)_9Cl_2]$; (c) polyhydroxyaluminum magnesium chlorosulfate, generally defined by the formula of: $[Al_4Mg(OH)_6(Cl)_4(SO_4)_2]$; polyhydroxaluminum zincoxide chloride, generally defined by the formula of: $[Al_3(OH)_3ZnO(OH)(Cl)_5]$; (e) polyhydroxysilicoaluminum ferromagnesium chlorosulfate generally defined by the formula of: $[Al_2O_3Cl_2 \cdot MgOFe_2O_3 \cdot Fe(OH)_2Cl \cdot 2SO_3 \cdot ySiO_2zH_2O]$ where $y=5$ to 8 and $z=2$ to 5; (f) polyhydroxyferromagnesium chlorosulfate generally defined by the formula of: $[Fe_4Mg(OH)_4(SO_4)_2(Cl)_6]$; (g) polyhydroxyaluminum ferromagnesium chlorosulfate generally defined by the formula of: $[Al_4Fe_4Mg_3(OH)_8(Cl)_8(SO_4)_7]$; (h) polyhydroxyferrocalcium sulfate generally defined by the formula of: $[F_4Ca(OH)_3(SO_4)_4(Cl)_3]$; (i) polyhydroxyaluminum magnesium chloride generally defined by the formula of: $[Al_3Mg_{1.5}(OH)_9(Cl)_3]$; (j) polyhydroxyaluminum magnesium chlorosulfate generally defined by the formual of: $[Al_3Mg(OH)_6(Cl)_3(SO_4)]$.

Unless specifically stated or otherwise defined all percentages given herein are in mole percentage.

The calcium and magnesium flocculating adducts of the present invention are generally produced by reacting from about 0.025 mole percent to about 6.0 mole percent of a material selected from the group of: (a) magnesium hydroxide, (b) magnesium oxide, (c) basic magnesium carbonate, or (d) magnesium chloride with from about 0.5 to about 12 mole percent of a multivalent cationic metal adduct formed, as hereinafter disclosed, in an acidic medium from a material selected from the group of: (a) iron sulfates, (b) iron chlorides, (c) aluminum sulfate (d) aluminum chloride (e) or one or more of the materials of groups a, b, c and d. Exemplary multivalent cationic adducts are: (a) polyhydroxyferrous sulfate (from iron sulfates), (b) polyhydroxyferrochloride (from iron chlorides), (c) polyhydroxyaluminum sulfate (from aluminum sulfate ) and (d) polyhydroxyaluminumchloride (from aluminum chloride).

Polyhydroxyaluminumchloride may generally be prepared by reacting aluminum oxide hydrate $[Al_2O_3 \cdot nH_2O$ where $n=0.5$ to 2.97] with a mixture of (1) hydrochloric acid [aqueous HCl] having a specific gravity of about 20 baume (Be) and (2) hydrochloric acid [aqueous HCl] having a specific gravity of about 22 baume (Be) in a mole percentage ratio of about 1:7.53. The reaction may occur in the presence of deionized water. The temperature of reaction is maintained in the range of from room temperature to about 110° C., preferably between about 50° C. and about 110° C., more preferably between about 100° C. and about 110° C., most preferably at about 105° C. The reaction may occur at pressures ranging from about one atmosphere to about 120 psi. If a pressure reaction is desired, a preferred pressure range is from about 10 to about 100 psi, more preferably about 15 to about 100 psi.

The reaction is completed in about 3 hours and additional operations such as filitration and neutralization are not generally necessary. Aluminum oxide hydrate (manufactured by the Bayer process) is commercially available and usually comprises about (a) 66.4% $Al_2O_3 \cdot nH_2O$ (n equals 0.5 to 3.0), (b) 0.03% silicon dioxide (silica) $[SiO_2]$, (c) 0.01% ferric oxide $[Fe_2O_3]$ and (d) 33.44% L.O.I. However, these percentages can and do vary depending on the supplier.

The presence of hydrochloric acid having a specific gravity of 20 baume greatly inhibits or generally prevents formation of acid adduct and allows the chlorine ion to associate easily with the hydrous aluminum oxide. The hydrochloric acid (20 baume) also facilitates formation of chlorine hydrate, generation of active aluminum species and acceleration of the reaction process. From time to time the reaction is injected with deionized water which, preferably, has been heated to the range of from about 60° C. to about 85° C. In this acid medium the deionized water easily associates with or grafts to the adduct under formation. Furthermore, the $Me^{III}$ chemistry of these reactions allows the mole ratios of $Al^{3+} \cdot Cl^-$ or $Al^{3+} \cdot SO_4^{2-}$ or, in the case of mixed acids, $Al^{3+} \cdot (Cl^- + SO_4^{2-})$ to be extended into quite low ranges.

The $Me_m^{III}$ chemistry of the reactions of the present invention, generally occurring in the presence of magnesium ions, allows a wide variation in the mole percentages in the materials utilized in a given reaction. Generally, in reactions occurring at one atmospheric pressure, the mole percentages of the materials utilized may be varied such that the mole ratio of $Al^{3+} \cdot Cl^-$ may vary between about 0.065 and about 2.5—this generally corresponds to mole percentages of hydrochloric acid [aqueous HCl] (20 baume) of from about 2.0 to about 40 and hydrochloric acid [aqueous HCl] (22 baume) of from about 5.0 to about 45. In the presence of sulfuric acid (a) the mole ratio of $Cl^-.SO_4^{2-}$ may vary from about 2.0 to about 10.0; (b) the mole ratio of $Al^{3+}.SO_4^{2-}$ may vary from about 0.05 to about 11.0; (c) the mole ratio of $Al^{3+}.(Cl^- + SO_4^{2-})$ may vary from about 0.059 to about 12.920. In general, in pressurized reactions occurring in the range of from about 15 pounds per square inch to about 120 pounds per square inch, more preferably from about 15 pounds per square inch to about 100 pounds per square inch, the mole percentages of the materials utilized may be varied such that the mole ratio of $Al^{3+}.Cl^-$ may vary from 0.08 to about 5.0—this corresponds to mole percentages of hydrochloric acid [aqueous HCl] (20 baume) of from about 2.0 to about 40 and hydrochloric acid [aqueous HCl] (22 baume) of from about 2.5 to about 50. In the presence of sulfuric acid (a) the mole ratio of $Cl^-.SO_4^{2-}$ may be varied from about 2 to about 16; (b) the mole ratio of $Al^{3+}.SO_4^{2-}$ may be varied from about 0.05 to about 11; (c) the mole ratio of $Al^{3+}.(Cl^- + SO_4^{2-})$ may be varied from about 0.059 to about 12.92 and (d) the mole ratio of $(Al^{3-} + Mg^{2+})Cl^-$ may be varied from about 0.350 to about 3.569.

An exemplary, but non-limiting, example of a process for making a flocculating adduct in accordance with the present invention would be to combine the following constituents in the following mole percentages:

hydrochloric acid, 22 baume, ... 32.370 mole percent
hydrochloric acid, 20 baume, ... 29.600 mole percent
aluminum oxide hydrate ... 7.860 mole percent
deionized water ... 26.72 mole percent These mole percentages correspond to an approximate Mole ratio of $Al^{3+}.Cl^-$ of 0.078. It is believed that each $Al^{3+}$ ion, in solution, is co-ordinated with six molecules of water and contributes half a positive charge to each water molecule. When a hydroxy $(OH^-)$ ion is attached to an $Al^{3+}$ ion it is believed that half of its negative charge will be used to neutralize half a positive charge contributed by the $Al^{3+}$ ion. This situation would leave another half of the negative charge of the $(OH^-)$ unsatisfied and available to coordinate with and balance another half of a positive charge from another functional group. Accordingly, polymerization of the hydroxyaluminum ion solution should continue until no further functional groups are available.

Based on these assumptions, the polymerization reaction mechanism is believed to proceed as represented below. $Al_2O_3(nH_2O) + 6HCl + 4H_2O \rightarrow 2HCl + 2.AlCl_2(OH)_4/H_3 \rightarrow nAl(OH)_2^+$ (where $nAl(OH)_2^+$ is the major species monomer unit and n=1 to 6)

This material may be further reacted, in the acidic medium, with magnesium hydroxide $[Mg(OH)_2]$. The reaction is believed to proceed as follows:

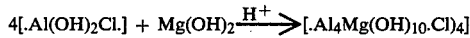

$$4[.Al(OH)_2Cl.] + Mg(OH)_2 \xrightarrow{H^+} [.Al_4Mg(OH)_{10}.Cl]_4$$

The flocculating adduct by this reaction has a deep yellow color and is very stable for a very long time, without crystallization, even at $-15°$ C. for a period of about 192 hours. The product has very good flocculation properties. It is believed that the presence of the magnesium ion in the inorganic polymer greatly facilitates this reaction especially at lower $Al^{3+}.Cl^-$ ratios such as, for example, about 0.05 to 2.50. This ratio may be extended to from about 0.05 to about 5.0 in the event a pressurized reaction process is utilized.

Production of the flocculating adducts of the present invention may also be carried out, under pressure, by utilizing a halide acid such as the above-discussed hydrochloric acid. A mixture of acids, such as, for example, hydrochloric acid with either or both sulfuric acid or nitric acid may, alternatively, be utilized to create the acidic reaction medium. The pressure reaction may be carried out within a temperature range varying from room temperature to about 110° C. If a pressurized reaction is utilized the pressure may be varied from about 10 pounds per square inch to about 120 pounds per square inch, more preferably, from about 15 to about 100 pounds per square inch.

A typical, non-limiting formulation for a pressurized reaction would entail, for example, blending components in the following amounts: (1) aluminum oxide hydrate—8.39 mole percent, (2) hydrochloric acid (22 baume)—33.71 mole percent, (3) hydrochloric acid (20 baume)—3.75 mole percent, (4) magnesium hydroxide/oxide—4.60 mole percent and (5) deionized water—49.53 mole percent.

These mole percents are not meant to be limiting since one of skill in the art, after review of the herein contained material, would recognize that they may be varied depending upon pressure and temperature.

The pressure type reaction may also advantageously be carried out in the presence of sulfuric acid $[H_2SO_4]$ with all of the ingredients being mixed prior to application of heat. The color of the end product of this reaction may vary from clear to yellowish.

A number of materials act as good catalysts and/or stabilizing agents for the reactions of the present invention. In particular, the catalytic/stabilizing materials may be selected from the group of: (a) sulfuric acid $[H_2SO_4]$, (b) phosphoric acid $[H_3PO_4]$, (c) phosphorous acid [ortho $H_3PO_3$], (d) hydrogen sulfide $[H_2S]$, (e) sodium hypochlorite [NaOCl], (f) silanols $[H_3SiOH, H_2Si(OH)_2$, etc ... ], (g) sodium sulfite $[Na_2SO_3]$, (h) sodium acid sulfite $[NaHSO_3]$, (i) dibasic sodium phosphate $[Na_2HPO_4]$ and (j) monobasic sodium phosphate $[NaH_2PO_4]$ and (k) alkyl polyglycols such as glycerol, sucrose and dextrose. One or more of these materials may be added to the reaction solution of the processes of the present invention in amounts ranging from about 0.02 mole percent to about 7 mole percent. A particularly preferred catalyst is sulfuric acid. The silanols are particularly useful in the processes used to form polyhydroxyaluminum ferroussilicic acid and polyhydroxyaluminum chlorozincoxide.

An exemplary, non-limiting, catalyzed reaction solution could be formed by combining the following ingredients in the following amounts: (a) aluminum oxide hydrate—11.07 mole percent, (b) hydrochloric acid (22 baume)—20.21 mole percent, (c) hydrochloric acid (20 baume)—2.24 mole percent, (d) 98% sulfuric acid—2.14 mole percent, (e) magnesium hydroxide/oxide—4.97 mole percent and (f) deionized water—59.37 mole percent.

In solution, this reaction mixture corresponds to an $Al^{3+}.SO_4^{2-}$ mole ratio of 10.469 and a $Cl^-.SO_4^{2-}$ mole ratio of 10.00. In a catalyzed reaction, such as this one, the $Cl^-.SO_4^{2-}$ mole ratio may vary from about 2.0 to about 10.0 whereas, in a catalyzed pressurized reaction, the $Cl^-.SO_4^{2-}$ mole ratio may vary from about 2.0 to about 16.0. The $Al^{3+}.Cl^-$ mole ratio in this example would normally be about 0.119. However, in the presence of sulfuric acid the $Al^{3+}.Cl^-$ mole ratio would be believed to be about 0.261. Furthermore, the combined mole ratio of $Al^{3+}.(Cl^- + SO_4^{2-})$ would be believed to be about 0.2644.

The major intermediate product formed during this exemplary reaction is believed to be $[Al_4(OH)_4(Cl)_2(SO_4)_2 2+]$. This material, in the acid medium, is thereafter reacted with magnesium hydroxide $[Mg(OH)_2]$ to form a very stable inorganic flocculating adduct believed to be defined by the general structure of: $[Al_4Mg(OH)_6(Cl)_6(SO_4)_2]$ While post reaction effects continue in some cases, the products obtained by the present processes are, in general, very stable flocculating materials. Generally speaking the post reaction effects are limited to pH changes which take place within less than 48 hours.

The flocculating materials of the present invention may be diluted with water, alkylglycols, polyhydrols, sulfuric acid, hydrochloric acid, nitric acid, sulfamic acid, phosphoric acid, hydroxyacetic acid or a mixture of two or more of these materials, as desired, for handling and use. Alternatively they may be diluted with sulfuric acid or further reacted with fuming sulfuric acid $[nH_2SO_4.ySO_3]$ or other inorganic or organic acids, as desired. Inorganic acids are preferred for economical reasons.

The inventive products, processes for their formation and relevant data thereof are presented below to more completely disclose the present invention to those of skill in the art.

EXAMPLE I

Polyhydroxyaluminum magnesium sulfate (PHAMS)

$[Al_4MgO(OH)_5(SO_4)_{3.5}]$

The reaction was contained within and regulated by a three thousand gallon glass lined reaction vessel equipped to agitate the reaction solution. The reaction vessel was also provided with a heating and cooling mantle, a condenser and a dripping funnel.

The process was initiated by charging the reaction vessel with about 17.29 mole percent of deionized water followed by about 2.08 mole percent of aluminum oxide hydrate $[Al_2O_3.nH_2O]$. This mixture was heated to about 45° C. while under constant agitation. Thereafter, the heat was cut off and about 2.059 mole percent of sulfuric acid $[H_2SO_4]$ (98% solution) was gradually, in small increments, added to the mixture over a period of about 40 minutes. During the 40 minute period the temperature of the reaction solution was maintained at less than 110° C. At the end of the 40 minute period, about 6.41 mole percent of sulfuric acid $[H_2SO_4]$ and about 16.11 mole percent of deionized water were added to the reaction solution. The reaction solution was maintained at a temperature between about 95° C. to about 110° C. for an additional reaction time of about 120 minutes. At this point in time an intermediate product was formed and is believed to have been polyhydroxyaluminum sulfate (PHAS). Upon conclusion of the 120 minute reaction period about 1.31 mole percent of magnesium hydroxide $[Mg(OH)_2]$ was added to the reaction solution which was then maintained at a temperature of between about 85° C. and about 95° C. for about 30 more minutes. At this point in time a yellow to light yellow soft waxy material was formed. The waxy material had, in solution, the following properties: (a) solids—47%, (b) p.H.—2.70, (c) specific gravity (g/ml)—1.340, (d) density (pounds/gallon)—11.157, (e) viscosity (cps)—25 and (f) a yellow liquid appearance.

Alternatively, (example 1a) preparation of polyhydroxyaluminum magnesium sulfate may be accomplished by initially charging the reaction vessel with about 47.63 mole percent of aluminum sulfate $[Al_2(SO_4)_3$ or $Al_2(SO_4)_3.18H_2O]$ and about 52.37 mole percent of alumina trihydrate $[Al_2O_3.3H_2O]$. The reaction is allowed to proceed for from about 60 to about 180 minutes (preferably 60 minutes) while being maintained in the temperature range of from about 80° C. to about 110° C. The reaction is believed to yield polyhydroxyaluminum sulfate (PHAS) having the formula of $[Al_4(OH)_3O(SO_4)_{3.5}]$. Thereafter, the PHAS is reacted with about 1.25 mole percent of magnesium hydroxide $[Mg(OH)_2]$ at a temperature range of from about 85° C. to about 95° C. and for about 30 minutes. The resulting product is polyhydroxyaluminum magnesium sulfate $[Al_4MgO(OH)_5(SO_4)_{3.5}]$.

The above detailed specific examples for preparing PHAMS are not meant to be limiting in that this material may be prepared in accordance with the process of example 1 by selecting materials from within the following ranges: (a) aluminum oxide hydrate $[Al_2O_3.nH_2O]$ from about 2 to about 8 mole percent, (b) 98% solution of sulfuric acid $[H_2SO_4]$—from about 12.2 to about 28 mole percent (total) [first addition may range from about 0.2 mole percent to about 3.0 mole percent, second addition may range from about 12 mole percent to about 25 mole percent], (c) magnesium hydroxide $[Mg(OH)_2]$—from about 1 to about 5 Mole percent, (d) deionized water—from about 22 to about 45 mole percent (total) [first addition may range from about 10 mole percent to about 20 mole percent, second addition may range from about 12 mole percent to about 25 mole percent], (e) reaction temperature ranges—from about 95° C. to about 110° C. and (f) total reaction time—approximately 3 hours. Those of skill in the art would, likewise, readily recognize that the process of example 1a may be carried out within wide ranges.

EXAMPLE II

Polyhydroxyaluminum magnesium chloride (PHAMC)

$[Al_3Mg(OH)_9.Cl_2]$

The reaction vessel described in Example I was initially charged with about 32.37 mole percent of hydrochloric acid [aqueous solution of HCl] (22 baume) and 29.60 mole percent of hydrochloric acid [aqueous solution of HCl] (20 baume). This mixture was heated to between about 50° C. and about 55° C. at which point about 7.86 mole percent of aluminum oxide hydrate $[Al_2O_3.nH_2O]$ was added, under agitation, and the heat was turned off. The reaction was allowed to proceed for about 180 minutes while being maintained at a temperature of between about 90° C. and about 97° C. At this point in time an intermediate product was formed and is believed to have been polyhydroxyaluminum chloride (PHAC) which is believed to have the general formula of $[Al_4(OH)_4(Cl)_8]$. At the end of the 180 minute reaction period approximately 3.45 Mole percent of magnesium hydroxide $[Mg(OH)_2]$ was introduced into the reaction vessel and the solution was maintained within the temperature range of from about 75° C. to about 80° C. for an additional 30 minutes whereupon a soft waxy material having a deep yellow color was formed. The waxy material had, in solution, the following properties: (a) solids—40 to 50%, (b) pH (neat)—1.4 to 2.0, (c) specific gravity (g/ml)—1.31 to 1.33, (d) density (pounds per gallon)—10.932 to 11.099, (e) viscosity (cps) [spindle #2 at 60 rpm]—20 to 35 and (f) a deep yellow appearance.

Alternatively, (example 2a) the polyhydroxyaluminum chloride (PHAC) may be manufactured by initially charging the reaction vessel with about 2.96 mole percent of aluminum chloride [AlCl$_3$] and about 97.12 mole percent of deionized water. Aluminum metal of about 8.055 or 11.509 atomic equivalent weight was added to this solution and the mixture was agitated while being slowly heated to between about 50° C. and about 60° C. This temperature range and the agitation was maintained until the aluminum metal was completely dissolved. Thereafter the resulting mixture was filtered and the solids were evaporated to a mass which is believed to correspond approximately to the structure of polyhydroxyaluminum chloride (PHAC). The resulting structure is believed to have the formula of (a) [Al$_8$(OH)$_{21}$.Cl$_3$] and/or (b) [Al$_{11}$(OH)$_{30}$Cl$_3$]. This intermediate product may be utilized, in accordance with the teachings of this example, in the further manufacture of PHAMC. In other words, PHAMC may be formed from this intermediate by introducing about 3.45 mole percent of magnesium hydroxide [Mg(OH$_2$)] into a reaction vessel containing the intermediate and allowing the reaction to proceed for about 30 minutes at a temperature range of from about 75° C. to about 80° C.

Another method for obtaining a similar polyhydroxyaluminum chloride intermediate is by substituting the aluminum chloride and deionized water of example 2a with about 3.0 mole percent of the PHAC intermediate formed in example 2 and then reacting this material with about 3.452 atomic equivalent weight of aluminum metal. The resulting intermediate product is believed to have the following formula—[Al$_4$(OH)$_9$Cl$_3$]. PHAMC may be manufactured from this intermediate by following the teachings of example 2a.

Yet another method, example 2c, for obtaining the polyhydroxyaluminum chloride intermediate comprises utilization of the process described above in example 2a with the exception that the reaction vessel is initially charged with (a) about 3.73 mole percent of aluminum chloride hydrate [AlCl$_3$.6H$_2$O], (b) about 91.62 mole percent of methanol [CH$_3$OH] or, alternatively, tert-butyl alcohol [(CH$_3$)$_3$(COH)] and (c) about 4.65 mole percent of sodium hydroxide [NaOH]. Thereafter, the solution is refluxed for about two hours and the sodium chloride [NaCl] produced is filtered off.

Even another method, example 2d, for preparing an intermediate material substantially equivalent to PHAC and useful in the manufacture of polyhydroxyaluminum magnesium chloride, in accordance with the teachings of the present example, can be accomplished by reacting about 50.66 mole percent of aluminum chloride [AlCl$_3$] with about 49.34 mole percent of alumina trihydrate [Al$_2$O$_3$.3H$_2$O]. The reaction temperature range is maintained between about 80° C. and about 100° C. for about 120 minutes. The reaction product obtained (believed to have the general formula of [Al$_3$(OH)$_7$(Cl)$_2$]) may thereafter be reacted with magnesium hydroxide [Mg(OH)$_2$] as described to produce polyhydroxyaluminum magnesium chloride (PHAMC).

The specific examples listed herein are not meant to be limiting on the method of preparation of polyhydroxyaluminum magnesium chloride (PHAMC) in that it is believed that this material may be obtained, in accordance with the procedures of example 2 by utilizing the following ranges of materials—(a) aluminum oxide hydrate [Al$_2$O$_3$.nH$_2$O]—from about 5 to about 12 mole percent, (b) hydrochloric acid [aqueous HCl](20 baume)—from about 25 to about 40 mole percent, (c) hydrochloric acid [aqueous HCl] (22 baume)—from about 30 to about 45 mole percent and (d) magnesium hydroxide [Mg(OH)$_2$]—from about 1.0 to about 5.0 mole percent. Those of skill in the art would, likewise, readily recognize that the processes of examples 2a through 2d may be carried out within wide ranges.

EXAMPLE III

Polyhydroxyaluminum magnesium chlorosulfate (PHAMCS)

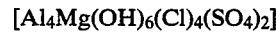

[Al$_4$Mg(OH)$_6$(Cl)$_4$(SO$_4$)$_2$]

A three thousand gallon glass lined reaction vessel, as described in Example I, was initially charged with about 11.5 mole percent of hydrochloric acid [aqueous HCl] (22 baume) and about 11.88 mole percent of hydrochloric acid [aqueous HCl] (20 baume). This mixture was slowly agitated while being heated to between about 50° C. and about 55° C. Thereafter, about 4.68 mole percent of aluminum oxide hydrate [Al$_2$O$_3$.nH$_2$O] was added and the heat was turned off. The exothermic reaction which followed was allowed to proceed for approximately 100 minutes, under agitation, while being maintained in the temperature range of from about 90° C. to about 95° C. At the end of the 100 minute period approximately 0.95 mole percent of 98% sulfuric acid [H$_2$SO$_4$] solution was slowly added while maintaining the reaction temperature at below 105° C. Thereafter, the reaction was allowed to continue for an additional 60 minutes while being maintained at a temperature below 100° C. At the end of the 60 minute period approximately 1.10 mole percent of magnesium hydroxide [Mg(OH)$_2$] was added to the reaction mixture over a period of less than 10 minutes. Upon addition of the magnesium hydroxide [Mg(OH)$_2$], the reaction mixture was cooled down to between about 85° C. and about 90° C. The reaction was continued for an additional 20 minutes whereupon the desired product formed as a soft yellow waxy material. The waxy material had, in solution, the following properties: (a) solids—45 to 50%, (b) pH (neat)—1.0 to 1.7, (c) specific gravity (g/ml)—1.250 to 1.300, (d) density (pounds per gallon)—10.431 to 10.849, (e) viscosity (cps)—15 to 25 and (f) a deep yellow appearance.

A modification of the example III procedure is possible, example 3a, by adding about 0.148 mole of aluminum metal to the reaction solution after addition of the magnesium hydroxide [Mg(OH)$_2$]. The end product of this modified example 3 procedure possessed, in solution, the following properties: (a) solids—53%, (b) pH (neat)—0.8, (c) specific gravity (g/ml)—1.325, (d) density (pounds per gallon)—11.057, (e) viscosity (cps) [spindle #2 at 60 rpm]—25 to 35 and (f) appearing as a clear solution having a light yellow color.

The specific examples listed herein are not meant to be limiting in that production of PHAMCS may be accomplished in accordance with the teachings of example III through utilization of the following ranges (a) aluminum oxide hydrate [Al$_2$O$_3$.nH$_2$O]—from about 4 to 11 mole percent, (b) hydrochloric acid [aqueous HCl](22 baume)—from about 10 to about 30 mole percent, (c) hydrochloric acid [aqueous HCl] (20 baume)—from about 10 to about 30 mole percent, (d) sulfuric acid [H$_2$SO$_4$] from about 0.1 to 2.0 mole percent and (e) magnesium hydroxide [Mg(OH)$_2$] from about 1.0 to 5.0 mole percent. Those of skill in the art would, likewise, readily recognize that the process of example 3a may be carried out within wide ranges.

EXAMPLE IV

Polyhydroxyaluminum zincoxide chloride (PHAZC)

$[Al_3(OH)_3ZnO(OH).(Cl)_5]$

PHAZC may be produced, in accordance with the procedures of example II, by substituting about 3.45 mole percent of zinc oxide [ZnO] for the magnesium hydroxide [Mg(OH)$_2$]. This specific example is not meant to be limiting, however, since it is believed that PHAZC may be made in accordance with the process stated in exmaple II by utilizing the following material ranges (a) aluminum oxide hydrate [Al$_2$O$_3$.nH$_2$O] about 5 to about 12 mole percent, (b) hydrochloric acid [aqueous HCl] (20 baume) about 25 to about 40 mole percent, (c) hydrochloric acid [aqueous HCl] (22 baume) about 30 to about 45 mole percent and (d) Zinc oxide [ZnO] about 1.0 to about 5.0 mole percent.

The end product obtained by substituting zinc oxide [ZnO] for magnesium hydroxide in example II had the following characteristics: (a) solids—40 to 50%, (b) pH (neat)—0.5 to 1.5, (c) specific gravity (g/ml)—1.33 to 1.36, (d) density (pounds per gallon)—11.099 to 11.349, (e) viscosity—(cps) [spindle #2 at 60 rpm]—15.5 to 25 and (f) a deep yellow appearance.

The specific mole percentages of example IV are not meant to be limited in that the production of PHAZC may be accomplished in accordance with the teachings of example IV through utilization of the following ranges: (a) hydrochloric acid (22 baume)—from about 30 to about 45 mole percent, (b) hydrochloric acid (20 baume)—from about 25 to about 40 mole percent, (c) aluminum oxide hydrate—from about 5 to about 12 mole percent and (d) zincoxide—from about 1.0 to about 5.0 mole percent.

EXAMPLE V

Polyhydroxysilicoaluminum ferromagnesium chlorosulfate (PHSAFMCS)

$[Al_2O_3Cl_2.MgOFe_2O_3Fe(OH)_2Cl.2SO_3.ySiO_2zH_2O]$

The three thousand gallon reaction vessel, as described in example I, was initially charged with about 6.253 moles of a 10% aluminum sulfate [Al$_2$(SO$_4$)$_3$ or Al$_2$(SO$_4$)$_3$.18H$_2$O] aqueous solution having a pH of from about 1.6 to about 2.2. Thereafter, over a period of about 45 minutes, about 4.398 moles of a 5% aqueous solution of sodium metasilicate [Na$_2$SiO$_3$] (SMS) (i.e. about one (1) part by weight of SMS was added per about three (3) parts per weight of the aqueous aluminum sulfate solution) was added to the aqueous aluminum sulfate solution. The resultant intermediate product was believed to be polyhydroxyaluminum silicic acid (PHASA). The reaction is believed to be defined by the following general formula:

$Al_2(SO_4)_3.H_2O + (Na_2O.ySiO_2zH_2O) \rightarrow (Al_2O_3.ySiO_2)_4H_2O[PHASA] + 3Na_2SO_4 + zH_2O$, where y is 5 to 8 and z is 2 to 5.

After addition of the SMS the reaction was continued at room temperature for about 15 minutes while maintaining the pH between about 1.0 to about 2.2. During this 15 minute period approximately 5.395 moles of ferrous sulfate [FeSO$_4$.7H$_2$O] was added to the approximate 5.96 moles of PHASA. At the end of the 15 minute period the solution was mixed for an additional 30 minutes to form polyhydroxyaluminum silicoferroussulfate (PHASFA) believed to have the general formula of: $[Al_2O_3ySiO_2.FeO.2SO_3.2H_2O.zH_2O$ where y=5-8 and z=2-5]. To approximately 3.944 moles of PHASFA and about 19.44 moles of deionized water about 10.08 moles of magnesium chloride [MgCl$_2$ or MgCl$_2$.6H$_2$O] was added during a second 30 minute period. Upon conclusion of the second 30 minute period and addition of the deionized water and magnesium chloride the reaction mixture was mixed for an additional 30 minutes to produce an material believed to have the following structure:

$[Al_2O_3Cl_2MgOFe_2O_3Fe(OH)_2Cl.2SO_3.ySiO_2.zH_2O]$ where y is 5 to 8 and z is 2 to 5.

This material, in solution, had the following characteristics: (a) solids—40 to 45%, (b) pH—0.7 to 1.1, (c) specific gravity—(g/ml) 1.12 to 1.18, (d) density (pounds per gallon)—9.346 to 9.847 and (e) viscosity (cps) [spindle #2, 60 rpm]—10 to 20.

The specific mole percentages of example V are not meant to be limiting in that the production of PHSAFMCS may be accomplished in accordance with the teachings of example V through utilization of the following ranges: (a) 10% aluminum sulfate solution—from about 4 to about 10 moles, (b) 5% sodium metasilicate solution—from about 3 to about 6 moles, (c) ferrous sulfate—from about 2 to about 8 moles, (d) deionized water—from about 10 to about 50 moles and (e) magnesium chloride—from about 2 to about 12 moles.

EXAMPLE VI

Polyhydroxyferromagnesium chlorosulfate (PHFMCS)

$[Fe_4Mg(OH)_4(SO_4)_2(Cl)_6]$

A first step in the production of PHFMCS is to produce polyhydroxyferrosulfate [Fe$_4$(OH)$_2$O(SO$_4$)$_4$].

Preparation of PHOFS utilized a three thousand gallon reaction vessel, as described in Example I, and which was also provided with a gas scrubber and a cooling system. The vessel was initially charged with about 56.89 mole percent of nitrosylsulfuric acid [ONO-SO$_3$H with H$_2$SO$_4$ (this material is the reaction product of peroxysulfuric acid [H$_2$SO$_5$ or HOSO$_2$OOH] and nitric acid [HNO$_3$])]. The nitrosylsulfuric acid was heated to between about 95° C. and about 100° C. while under agitation at which point about 31.78 mole percent of technical grade ferrous sulfate [FeSO$_4$.7H$_2$O] was added over a 90 minute period. At the end of the 90 minute period of agitation the mixing of the reaction solution was continued for an additional 20 minutes. Thereafter, the product was cooled down and diluted with water to about 47% solids (PHOFS). The product, in solution, had the following characteristics: (a) solids—45 to 50%, (b) pH (neat)—0.75 to 1.15, (c) viscosity (cps) [spindle #2 at 60 rpm]—20 to 30, (d) specific gravity (g/ml)—1.507, (e) density (pounds per gallon)—12.576 and (f) having a brown liquid appearance.

Thereafter, approximately 7.55 mole percent of magnesium chloride [MgCl or MgCl$_3$.6H$_2$O] was added to the approximately 3.78 mole percent (328.5 grams) of PHOFS, under agitation and at room temperature. This solution was mixed for an additional 30 minutes whereupon the product formed is believed to have the following general structure: $[/Fe_4Mg(OH)_4(SO_4)_2(Cl)_6/]$ The reaction mechanism for obtaining this material is believed to be:

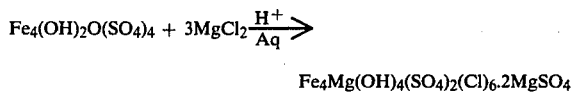

$$Fe_4Mg(OH)_4(SO_4)_2(Cl)_6 \cdot 2MgSO_4$$

The resulting product had, in solution, the following characteristics: (a) solids—55.5%, (b) pH (neat)—0.55, (c) specific gravity (g/ml)—1.444, (d) density (pounds per gallon) 12.050, (e) viscosity (cps)—24 and (f) a brown liquid appearance.

Many alternative possibilities for producing the PHOFS intermediate are possible. For example, the procedures of Example VI may be followed with the exception that chlorine gas is substituted for the nitrosylsulfuric acid. In this instance about 0.71 pound (322.34 g) of chlorine gas should be added for each pound of ferrous ions ($Fe^{2+}$). The chlorine gas may, alternatively, be combined with sodium hypochlorite [NaOCl]. Another possibility is substituting hydrogen peroxide [$H_2O_2$] for the nitrosylsulfuric acid. In this instance about 120 milligrams of 30 percent hydrogen peroxide solution should be added for each 112 milligrams of ferrous ions ($Fe^{2+}$). Yet another alternative for manufacturing PHOFS is substituting oxygen or air for the nitrosylsulfuric acid. In this instance about 1.2 pounds of oxygen or air should be added for each pound of ferrous ions ($Fe^{2+}$). Yet a further alternative involves the substituting of sodium peroxide [$Na_2O_2$] and hydrochloric acid [aqueous HCl] (22 baume) for the nitrosylsulfuric acid. Yet another alternative involves substituting peroxyhydroxysulfuric acid for the nitrosylsulfuric acid. An even further alternative involves substituting the nitrosylsulfuric acid with an ionic mixture, in solution, of ($HSO_3^-/ClO_3^+$) in a ratio of (3.45–5.75)/(1.0–1.15). Alternatively, the ionic mixture may be saturated with sodium, lithium, potassium or amonia. This can be accomplished, for example, in the use of sodium by mixing about 0.0403 gram per liter of sodium sulfite [$Na_2SO_3$] or about 2.64 grams of sodium sulfate [$Na_2SO_4$] with with a sodium chlorate [$NaClO_3$] solution of from about $1 \times 10^{-3}$ to about $9.2 \times 10^{-4}$ mole/liter and sulfuric acid [98%$H_2SO_4$] at between about 35° C. and about 80° C.

The specific examples listed herein are not meant to be limiting in that the production of PHFMCS may be accomplished in accordance with the teachings of example VI through utilization of the following ranges: (a) from about 50 to about 70 mole percent of nitrosylsurfic acid, (b) from about 20 to about 50 mole percent of ferrous sulfate and (c) from about 0.02 to about 10 mole percent of magnesium chloride. Those of skill in the art would, likewise, readily recognize that the process of the alternative examples to example VI may be carried out within wide ranges.

EXAMPLE VII

Polyhydroxyaluminum ferromagnesium chlorosulfate (PAFMCS)

The reaction vessel described in example VI was initially charged with (a) about 87.63 mole percent of deionized water, (b) about 1.23 mole percent of ferric sulfate [$Fe_2(SO_4)_3$ or $Fe_2(SO_4)_3 \cdot 9H_2O$] and (c) about 1.30 mole percent of aluminum sulfate [$Al_2(SO_4)_3$ or $Al_2(SO_4)_3 \cdot 18H_2O$]. This mixture was warmed to about 35° C. under constant agitation. Upon equilibrium of the solution at 35° C., about 0.440 mole percent of sodium sulfite [$Na_2SO_3$ or $Na_2SO_3 \cdot 7H_2O$], a catalyst stabilizer, was added and mixing of the solution was continued for about 10 minutes. During the following 120 minutes the temperature of the mixture was maintained within the range of about 35° C. to about 45° C. and about 3.11 Mole percent of a mixture comprising magnesium oxide [MgO] and calcium carbonate [$CaCO_3$] blended togehter at a 1:1 mole ratio was added in small amounts. After filtration of the reaction solution about 6.29 mole percent hydrochloric acid [aqueous HCl] (20 baume) was added to the filtrate over a 10 minute period while maintaining the temperature of the solution below about 35° C. Thereafter, agitation of the reaction solution was continued for an additional 10 minutes and the solution was cooled down to obtain a product, without precipitation. Upon dilution, with water the product obtained had, in solution, the following characteristics: (a) solids—23%, (b) pH (neat)—2.35, (c) specific gravity (g/ml)—1.139, (d) density (pounds per gallon)—9.505, (e) viscosity (cps) [spindle #2; 60 rpm]—7.0 and (f) a brown-reddish appearance.

The specific mole percentages of example VII are not meant to be limiting in that the production of PAFMCS may be accomplished in accordance with the teachings of example VII through utilization of the following ranges: (a) ferric sulfate—from about 0.5 to about 12 mole percent, (b) aluminum sulfate—from about 0.5 to about 12 mole percent, (c) deionized water—from about 75 to about 115 mole percent, (d) sodium sulfite—from about 0.02 to about 7.0 mole percent, (e) magnesium oxide/calcium carbonate blend—from about 0.02 to about 10 mole percent and (f) hydrochloric acid (20 baume)—from about 5 to about 15 mole percent.

EXAMPLE VIII

Polyhydroxyferrocalcium sulfate (PFCS)

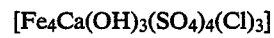

The procedures of example VII were repeated with the exception that (a) about 6.66 mole percent of calcium chloride [$CaCl_2$ or $CaCl_2 \cdot H_2O$ or $CaCl_2 \cdot 2H_2O$ or $CaCl_2 \cdot 6H_2O$] was substituted for the 3.11 mole percent of magnesium oxide and calcium carbonate; (b) about 2.60 mole percent of polyhydroxyferrosulfate (PHFS) [$Fe_4(OH)_2O(SO_4)_4$—see example VI] and (c) 84.01 mole percent of water was utilized was substituted for the aluminum and ferric sulfates. The reaction product obtained is believed to have the general formula of [$Fe_4Ca(OH)_3(Cl)_3 (SO_4)_4$]. This product, in solution, had the following properties: (a) solids—60%, (b) pH—0.84, (c) specific gravity (g/ml)—1.520, (d) density (pounds per gallon)—12.684, (e) viscosity (cps) [spindle #2 at 60 rpm]—40 and (f) a dark brown liquid appearance.

The specific mole percentages of example VIII are not meant to be limiting in that the production of PFCS may be accomplished in accordance with the teachings of example VIII through utilization of the following ranges: (a) deionized water—from about 75 to about 110 mole percent, (b) polyhydroxyferrosulfate—from about 0.2 to about 15 mole percent, (c) sodium sulfite—from about 0.02 to about 7 mole percent, (d) calcium chloride—from about 0.5 to about 12 mole percent and (e) hydrochloric acid (22 baume)—from about 5 to about 15 mole percent.

EXAMPLE IX

Polyhydroxyaluminum magnesium chloride (PHAMC)

[Al$_3$Mg$_{1.5}$(OH)$_9$(Cl)$_3$]

A suitable pressure reaction vessel equipped with a cooling system, agitation system and temperature control was initially charged with (a) about 8.39 mole percent of aluminum oxide hydrate [Al$_2$O$_3$.nH$_2$O], (b) about 37.45 mole percent of hydrochloric acid [aqueous HCl] (22 baume), (c) about 4.66 mole percent of magnesium oxide [MgO], and (d) about 49.50 mole percent of deionized water. Thereafter, the reaction vessel was closed and heat and pressure were gradually applied. The pressure was increased to about 65 pounds per square inch and the temperature of the reaction was generally controlled within the range of 95° C. to 100° C. The temperature of reaction should not be allowed to go over 110° C. The reaction continued for about 90 minutes. The reaction could be continued for up to about 300 minutes, or more, if desired. The end product had, in solution, the following properties: (a) solids—40 to 52%, (b) pH (neat)—1.2 to 4.5, (c) specific gravity (g/ml)—1.3 to 1.36, (d) density (pounds per gallon)—10.849 to 11.349, (e) viscosity (cps) [spindle #2 at 60 rpm]—20 to 32 and (f) a yellow to clear appearance.

The specific mole percentages of example IX are not meant to be limiting in that the production of PHAMC may be accomplished in accordance with the teachings of example IX through utilization of the following ranges: (a) aluminum oxide hydrate—from about 2 to about 20 mole percent, (b) hydrochloric acid (22 baume) from about 25 to about 50 mole percent, (c) magnesium oxide—from about 0.5 to about 5.0 mole percent, (d) deionized water—from about 30 to about 70 mole percent and (e) pressure—from about 10 to about 120 pounds per square inch.

EXAMPLE X

Polyhydroxyaluminum magnesium chlorosulfate (PHAMCS)

[Al$_3$Mg(OH)$_6$(Cl)$_3$(SO$_4$)]

The experimental conditions of example IX were repeated with the exception that the pressure reaction vessel was initially charged with the following composition: (a) to about 15.34 mole percent aluminum oxide hydrate [Al$_2$O$_3$.nH$_2$O], (b) about 3.24 mole percent of magnesium hydroxide [Mg(OH)$_2$], (c) to about 16.74 mole percent of hydrochloric acid [aqueous HCl] (20 baume), (d) about 1.93 mole percent of 98% sulfuric acid [H$_2$SO$_4$] and (e) about 62.75 mole percent of deionized water.

The end product had, in solution, the following properties: (a) solids—40 to 50%, (b) pH (neat)—1.2 to 4.0, (c) specific gravity (g/ml)—1.28 to 1.36, (d) density (pounds per gallon)—10.681 to 11.349, (e) viscosity (cps) [spindle #2 at 60 rpm]—18 to 32 and (f) a yellow to clear water appearance.

The specific mole percentages of example X are not meant to be limiting in that production of PHAMCS may be accomplished in accordance with the teachings of example X through utilization of the following ranges: (a) aluminum oxide hydrate—from about 2 to about 20 mole percent, (b) magnesium hydroxide—from about 0.02 to about 10 mole percent, (c) hydrochloric acid (20 baume)—from about 10 to about 40 mole percent, (d) sulfuric acid—from about 1 to about 5 mole percent, (e) deionized water—from about 30 to about 70 mole percent and (f) pressure—from about 10 to about 120 pounds per square inch.

To further exemplify and demonstrate the improved characteristics of the flocculating materials disclosed above numerous tests were conducted. These tests and their results are discussed below.

TEST I

Waste water from a metal plating operation was treated, at a pH of less than 9, with 1,200 parts per million of each of the below-indicated treating materials.

| | | SAMPLE A | | | | |
|---|---|---|---|---|---|---|
| | | After Treatment | | | | |
| Contaminate | Before Treatment mg/l | with 38% FeCl$_3$ mg/l | with 48.5% alum mg/l | with Product A mg/l | with Product B mg/l | with Product C mg/l |
| Copper | 3.03 | 2.0 | 1.0 | 0.02 | 0.03 | 0.05 |
| Nickel | 8.0 | 1.5 | 1.7 | 0.16 | 0.10 | 0.14 |
| Zinc | 7.63 | 3.3 | 1.9 | 0.05 | 0.07 | 0.05 |
| Lead | 1.8 | 0.18 | 0.10 | 0.01 | 0.01 | 0.01 |

| | | SAMPLE B | | | | |
|---|---|---|---|---|---|---|
| | | After Treatment | | | | |
| Contaminate | Before Treatment mg/l | with 38% FeCl$_3$ mg/l | with 48.5% alum mg/l | with Product A mg/l | with Product B mg/l | with Product C mg/l |
| Copper | 8.0 | 3.0 | 2.0 | 0.8 | 0.4 | 0.7 |
| Nickel | 26.5 | 2.5 | 6.7 | 0.65 | 0.55 | 0.8 |
| Zinc | 18.0 | 5.3 | 2.4 | 0.01 | 0.05 | 0.02 |
| Lead | 2.0 | 0.16 | 0.39 | <0.1 | <0.1 | <0.1 |

Where: (1) product A is polyhydroxyaluminum magnesium chlorosulfate (PHAMCS) [Al$_4$Mg(OH)$_6$(Cl)$_4$(SO$_4$)$_2$]—see Example III; (2) product B is polyhydroxyferromagnesiumchlorosulfate (PHFMCS) [Fe$_4$Mg(OH)$_4$(SO$_4$)$_2$(Cl)$_6$]—see Example VI and (3) product C is polyhydroxyaluminum ferromagnesium chlorosulfate [Al$_4$Fe$_4$Mg$_3$(OH)$_8$(Cl)$_8$(SO$_4$)$_7$]—see Example VII.

TEST II

Waste water from a titanium pickling process that is believed to have used baths of hydrochloric acid [aqueous HCl] and ferric chloride [FeCl$_3$], nitric acid [HNO$_3$] and hydrogen fluoride [HF], sulfuric acid [H$_2$SO$_4$] and Kolene salts (An anhydrous molten oxidizing salt bath using a sodium hydroxide base with additives necessary to provide controlled chemical oxidizing and dissolving properties.) was treated, at a pH of less than 9, with polyhydroxysilicoaluminum ferrousmagnesium chlorosulfate [Al$_2$O$_3$Cl$_2$.MgOFe$_2$O$_3$Fe(OH)$_2$Cl.2SO$_3$.ySiO$_2$zH$_2$O] see example V, hereinafter product D, at a dose level of 1,200 milligrams per liter. Comparison of conventional treating materials was not made because it is believed that no conventional treating material will separate any practical quantities of Cr$^{6+}$ and total Cr. The results of this test are recorded below:

| Contaminate | Before Treatment (mg/l) | After Treatment (mg/l) |
|---|---|---|
| Copper | 0.05 | <0.05 |
| Nickel | 1.75 | <0.05 |
| Zinc | 0.11 | <0.01 |

-continued

| Contaminate | Before Treatment (mg/l) | After Treatment (mg/l) |
|---|---|---|
| $Cr^{+6}$ | 78.75 | 20.01 |
| Total Cr | 42.50 | 0.46 |

TEST III

Waste water from a car wash operation was treated, at a pH of less than 9, with (1) a conventional solution of ferric chloride [$FeCl_3$] and (2) polyhydroxyaluminum magnesium sulfate [$Al_4MgO(OH)_5(SO_4)_{3.5}$], see Example I, hereinafter product E, in 500 parts per million doses. The results of these treatments are indicated below.

| Contaminate or Parameter | Before Treatment (mg/l) | After Treatment with 38% $FeCl_3$ (mg/l) | After Treatment with PHAMS (mg/l) |
|---|---|---|---|
| $BOD_5$ | 2,500 | 690 | 395 |
| Cr | 1.12 | 0.31 | 0.05 |
| Zinc | 6.34 | 1.496 | 0.701 |
| Nickel | 0.36 | 0.18 | 0.107 |
| Copper | 19.40 | 2.14 | 0.110 |
| Lead | 5.64 | 1.54 | 0.18 |
| Cadmium | 0.176 | 0.62 | 0.066 |
| F(−) | 210 | 61.0 | 2.10 |
| Total Suspended Solids (TSS) | 930 | 98.0 | 3.1 |

TEST IV

Super concentrated acrylic sizing latex waste water from an ultrafiltration unit was treated with 600 parts per million doses of conventional ferric chloride [$FeCl_3$] and alum (aluminum sulfate [$Al_2(SO_4)_3$ or $Al_2(SO_4)_3.18H_2O$]) treating materials and Products A, B and C (as identified above) of the present invention. The results of this treatment are indicated below.

| Parameter | Before Treatment | After Treatment with 38% $FeCl_3$ | with 50% alum | with Product A | with Product B | with Product C |
|---|---|---|---|---|---|---|
| Chemical Oxygen Demand (COD) | 45,963 | 34,000 | 32,000 | 6,500 | 5,100 | 4,800 |

To achieve results equivalent to those of the present invention the ferric chloride and alum treatments had to be utilized in large amounts which resulted in a highly concentrated solid waste which was unsuitable for practical purposes and involved a very slow filtration procedure which generated back pressures of about 8 to 15 pounds per square inch. In contrast products A, B and C provided highly satisfactory results with very fast filtration involving very little or no back pressure. It was additionally noted that substantially no coagulation (flocculation) resulted in utilization of the ferric chloride and alum treating materials in amounts equivalent to that which was utilized with regard to the products of the present invention. In any event, the small amount of sludge formed by the ferric chloride and alum treatments would not support combustion. In further contrast to the ferric chloride and alum treatments, products A, B and C reacted quickly with the solution to be treated and removed about 90% of the total solids. The sludge formed thereby was combustible and appeared to be compact and solid. Lastly, the sludge of the ferric chloride and alum treatments and that of products A and B were tested for Karl Fisher retained moisture content. The results of these tests were as follows: (a) alum 79.1% retained moisture, (b) $FeCl_3$ 73.85% retained moisture, (c) product A 57% retained moisture and (D) product B 46.2% retained moisture. The lower level of retained moisture of products A and B supports the finding that the sludges of products A and B are more combustible than those formed by the conventional $FeCl_3$ and alum treatments.

TEST V

Waste water from a textile dying operation that included wool coloring and indigo treatment was treated with 1,500 milligrams per liter doses of conventional ferric chloride and aluminium sulfate. In both of these cases lime was included for purposes of neutralization. The waste water was also treated with 1,500 milligrams per liter doses of products A, B and C (as defined above) of the present invention. The degree of clarification of the waste water in terms of color index and percent of sludge created from a given volume of waste water is recorded below.

| Parameter | Before Treatment | After Treatment with $FeCl_3$ | with alum | with Product A | with Product B | with Product C |
|---|---|---|---|---|---|---|
| color index | 0.0 | 3.5 | 4.0 | 4.5–5 | 5 | 4.5 |
| % sludge created from total volume waste water | — | 25 | 30 | 10 | 10 | 10 |

Where the units of the color index are arbitrarily defined as: 0.00—dark, 1.0—very intense color, 2.0—intense color, 3.0—moderate color, 4.0—some color, 5.0—colorless (clear water). It was noted that the sludge created with the ferric chloride and aluminum sulfate solution settled slowly whereas the small amount of sludge created from use of products A, B and C settled rapidly.

The waste water from the wool scouring operation was also treated, in an air flotation treatment, with (1) a combination of 250 parts per million of a polyamine (Sanfloc C 700), 40 parts per million of an acrylamide (Sanfloc N 50 P) and 1,500 parts per million of alum and (2) product A, above, of the present invention. Both air flotation treatments were conducted at room temperature. The results are indicated below:

| Parameter | Before Treatment | After Treatment with Combination Composition | with Product A |
|---|---|---|---|
| pH | 8.75 | 7.25 | 7.50 |
| $BOD_5$ (biological oxygen demand)(ppm) | 4,985 | 1,200 | 225 |
| TSS (total suspended solids)(ppm) | 7,585 | 250 | 24.5 |
| Normal Hexane (ppm) | 5,200 | 65 | 20 |

-continued

| Parameter | Before Treatment | After Treatment with Combination Composition | with Product A |
|---|---|---|---|
| (extract) | | | |

TEST VI

Waste water from a titanium alloy scouring processing plant having a total phosphorous (as phosphate) content of 3.78 milligrams per liter was treated, at a pH of less than 9.0, with 250 parts per million of (1) 38% $FeCl_3$, (2) 48.5% alum, (3) product A of the present invention (defined above) and (4) product B of the present invention (defined above). The resultant phosphate content was then determined. The results of this test are indicated below.

| Parameter | Before Treatment mg/l | After Treatment with 38% $FeCl_3$ mg/l | with 48.5% alum mg/l | with Product A mg/l | with Product B mg/l |
|---|---|---|---|---|---|
| Phosphate content | 3.78 | 3.55 | 1.70 | 0.01 | 0.01 |

TEST VII

Waste water from acrylic and acrylic-vinyl latex paint was treated with polyaluminumchloride (PAC) commercially available under the tradename "Astrigen" and Polyhydroxyaluminumzincoxidechloride (PHAZC) $[Al_3(OH)_3ZnO(OH).(Cl)_5]$—see example IV, hereinafter product F. The paint waste water was also treated with polyhydroxyaluminum magnesium chloride (PHAMC) $[Al_3Mg_{1.5}(OH)_9(Cl)_3]$—see example IX, hereinafter product G. The clarity of the supernatant was determined and is expressed below in NTU (nefelometric turbidity unit) units. These results are detailed below.

| Parameter | Before Treatment | After Treatment with 50% PAC | with 50% Product F | with 50% Product G |
|---|---|---|---|---|
| Acrylic latex (ppm) | — | 2,200 | 1,000 | 1,000 |
| pH | 6.5 | — | — | — |
| Solids | 5% | — | — | — |
| Turbidity (NTU) | — | 55 | 18 | 22 |
| Normal Hexane (ppm) | 4,900 | 120 | 45 | 57 |

TEST VIII

Turbid water from the Charlotte Municipal plant was treated with two conventional materials (1) a 48.5% solution of alum and (2) a 50% solution Astrigen (PAC). The Municipal plant water was also treated with (a) a 50% solution of polyhydroxyaluminum magnesium chloride (PHAMC) $[Al_3Mg(OH)_9.Cl_2]$—see Example II, hereinafer product H, and a 50% solution of product A, defined above. The water was treated with a dosage of 125 milligrams of treating material per liter and the treatment occurred at a pH of 6.5 and 8.5. The results of this test, which was designed to determine the efficiency of phosphate treatment by the new products are detailed below:

| Parameter | Before Treatment pH | After Treatment with 48.5% alum | with 50% PAC | with 50% Product H | with 50% Product A |
|---|---|---|---|---|---|
| Total phosphor as a phosphate | 6.5 | 5.6 | 0.29 | 0.16 | 0.1 | 0.1 |
| Total phosphor as a phosphate | 8.5 | — | 1.90 | 1.10 | 0.18 | 0.19 |

Astrigen may be obtained from the Robinson-Wagner Company of Mamaroneck, New York. This experiment demonstrated that the flock and sludge created by the products of the present invention are more stable at alkaline pHs as opposed to conventional alum and Astrigen. This statement is true even though the alum and Astrigen replace some of the phosphor absorbed into the flock during the coagulation process. The striking superiority of the products of the present invention at high pHs (for example, 8.5) is demonstrated by Test VIII which clearly shows the inefficiency of the conventional materials at such high pH levels. The instability of the conventional products at certain pHs is known.

TEST IX

Low turbidity water from the Charlotte drinking water plant was treated, at a pH of 6.5 and with a dosage of 7 milligrams per liter with the following materials: (a) 48.5% solution of alum (aluminum sulfate), (b) 38% solution of ferric chloride $[FeCl_3,]$ (c) polyaluminumsulfophosphate as disclosed in example I of U.S. Pat. No. 4,131,546 to LaPorte Industries, hereinafter product 1, (d) polyaluminumsulfate (PAS) as disclosed in example I in U.S. Pat. No. 4,284,611 to the Allied Chemical Company, hereinafter product 2, (e) polyaluminumferric chloride (PAFC) as disclosed in Example I of European Patent Application No. 80103202, hereinafter product 3, (f) a 50% solution of Astrigen which may be obtained from the Robinson-Wagner Company, hereinafter product 4, (g) basic aluminumchlorosulfate (BACS) as disclosed in U.S. Pat. No. 3,544,476 to Taki Fertilizer, hereinafter product 5, (h) Basic aluminum chloride (BAC) as disclosed in U.S. Pat. No. 3,544,476 to Taki Fertilizer, hereinafter product 5B, (i) monomeric aluminumhydroxide as disclosed in U.S. Pat. No. 4,051,028 to the Degremount Company, hereinafter product 6. The low turbidity Charlotte drinking water was also treated with the following products of the present invention: (1) polyhydroxyaluminummagnesiumsulfate (PHAMS) $[Al_4MgO(OH)_5(SO_4)_{3.5}]$—see Example I—product E, (2) polyhydroxyaluminum magnesium chloride (PHAMC) $[Al_3Mg(OH)_9.Cl_2]$—see Example II, product H, (3) polyhydroxyaluminum magnesium chlorosulfate (PHAMCS) $[Al_4Mg(OH)_6(Cl)_4(SO_4)_2]$—see Example III, product A and (4) polyhydroxyaluminum magnesium chloride (PHAMC) $[Al_3Mg_{1.5}(OH)_9(Cl)_3]$—see Example IX, product G.

After addition of the treating material the samples were initially mixed at 100 rpm for 1 minute after which they were mixed at 40 rpm for 10 minutes. Thereafter settling was allowed to occur for 30 minutes. Throughout the experiment the water temperature was maintained at 15° C. The initial turbidity of the water at pH 6.5 was 12 NTU. The results of this experiment are detailed below.

| Treating Product | pH | Residual Turbidity (NTU) |
|---|---|---|
| Alum (48.5%) | 6.5 | 15 |
| FeCl$_3$ (38%) | 6.5 | 85 |
| Product 1 | 6.5 | 2.1 |
| Product 2 | 6.5 | 2.2 |
| Product 3 | 6.5 | 2.8 |
| Product 4 | 6.5 | 1.8 |
| Product 5A | 6.5 | 2.0 |
| Product 5B | 6.5 | 1.7 |
| Product 6 | 6.5 | 1.7 |
| Product E | 6.5 | 1.0–1.1 |
| Product H | 6.5 | 1.0–1.15 |
| Product A | 6.5 | 0.9–1.0 |
| Product G | 6.5 | 1.2–1.3 |

Upon completion of the testing detailed above the pH of the waste water was adjusted to 8.5 by addition of 1% lime in the form of a 100 ppm solution of calcium carbonate [CaCO$_3$]. The final turbidity of the water at pH 8.5 was 24 NTU. The residual turbidity of the 8.5 pH solution was then determined. These results are detailed below.

| Treating Product | pH | Residual Turbidity (NTU) |
|---|---|---|
| Alum (48.5%) | 8.5 | 35 |
| FeCl$_3$ (38%) | 8.5 | 25 |
| Product 1 | 8.5 | 8.7 |
| Product 2 | 8.5 | 8.6 |
| Product 3 | 8.5 | 6.3 |
| Product 4 | 8.5 | 7.8 |
| Product 5A | 8.5 | 8.0 |
| Product 5B | 8.5 | 9.1 |
| Product 6 | 8.5 | 7.8 |
| Product E | 8.5 | 4.4 |
| Product H | 8.5 | 3.3 |
| Product A | 8.5 | 3.0 |
| Product G | 8.5 | 4.6 |

The above description is set forth only for purposes of illustration and is not meant to be taken in a limited sense. Various modifications and alterations will be readily suggested to persons skilled in the art. It is intended, therefore, that the foregoing be considered as exemplary only and that the scope of the invention be ascertained from the following claims.

I claim:

1. A flocculating adduct adapted for use in purification of a liquid, said adduct being selected from the following group:
   (a) polyhydroxyaluminum magnesium sulfate generally defined by the formula of: $Al_4MgO(OH)_5(SO_4)_{3.5}$;
   (b) polyhydroxyaluminum magnesium chloride generally defined by the formula of: $Al_3Mg(OH)_9.Cl_2$;
   (c) polyhydroxyaluminum magnesium chlorosulfate generally defined by the formula of: $Al_4Mg(OH)_6(Cl)_4(SO_4)_2$;
   (d) polyhydroxyaluminum zincoxide chloride generally defined by the formula of: $Al_3(OH)_3.ZnO(OH).(Cl)_5$;
   (e) polyhydroxysilicoaluminum ferromagnesium chlorosulfate generally defined by the formula of: $Al_2O_3Cl_2.MgOFe_2O_3Fe(OH)_2Cl.2SO_3.ySiO_2z-H_2O$ where y=5 to 8 and z=2 to 5;
   (f) polyhydroxyferromagnesium chlorosulfate generally defined by the formula of: $Fe_4Mg(OH)_4(SO_4)_2(Cl)_6$;
   (g) polyhydroxyaluminum ferromagnesium chlorosulfate generally defined by the formula of: $Al_4Fe_4Mg_3(OH)_8(Cl)_8(SO_4)_7$;
   (h) polyhydroxyferrocalcium sulfate generally defined by the formula of: $Fe_4Ca(OH)_3(SO_4)_4(Cl)_3$;
   (i) polyhydroxyaluminum magnesium chloride generally defined by the formula of: $Al_3Mg_{1.5}(OH)_9(Cl)_3$;
   (j) polyhydroxyaluminum magnesium chlorosulfate generally defined by the formula of: $Al_3Mg(OH)_6(Cl)_3(SO_4)$; or
   (k) two or more of the flocculating adducts of paragraphs (a) through (j) of this claim.

2. A process for making a flocculating adduct adapted for use in purification of liquids, comprising, in the order given, the steps of:
   (a) charging a reaction vessel with a mixture of (1) from about 10 to about 20 mole percent of deionized water and (2) from about 2 to about 8 mole percent of alumunium oxide hydrate;
   (b) heating the mixture, under agitation, to about 45° C.;
   (c) adding from about 0.2 to 3.0 mole percent of sulfuric acid to the mixture over a period of about 40 minutes while maintaining the temperature of the mixture below about 110° C.;
   (d) adding (1) from about 3.0 to about 10 mole percent of sulfuric acid and (2) from about 12 to about 25 mole percent of deionized water to the mixture and maintaining the temperature of the mixture between about 95° C. and about 110° C. for about 120 minutes; and
   (e) adding from about 1 mole percent to about 5 mole percent of magnesium hydroxide to the mixture and maintaining the temperature of the mixture between about 85° C. and 95° C. for about 30 minutes.

3. A process for making a flocculating adduct adapted for use in purification of liquids, comprising, in the order given, the steps of:
   (a) charging a reaction vessel with a mixture of (1) from about 30 to about 45 mole percent of hydrochloric acid having a specific gravity of about 22 baume and (2) from about 25 to about 40 mole percent of hydrochloric acid having a specific gravity of about 20 baume;
   (b) heating the mixture, under agitation, to between about 50° C. and 55° C.;
   (c) adding, under agitation, from about 5 to 12 mole percent of aluminum oxide hydrate to the mixture and maintaining the temperature of the mixture between about 90° C. and 97° C. for about 180 minutes; and
   (d) adding from about 1.0 to 5.0 mole percent of magnesium hydroxide to the mixture and maintaining the temperature of the mixture between about 75° C. and 80° C. for about 30 minutes.

4. A process for making a flocculating adduct adapted for use in purification of liquids, comprising, in the order given, the steps of:
   (a) charging a reaction vessel with a mixture of (1) from about 10 to about 30 mole percent of hydrochloric acid having a specific gravity of about 22 baume and (2) from about 10 to about 30 mole percent of hydrochloric acid having a specific gravity of about 20 baume;

(b) heating the mixture, under agitation, to between about 50° C. and about 55° C.;

(c) adding from about 4 to about 11 mole percent of aluminum oxide hydrate to the mixture and maintaining the temperature of the mixture between about 90° C. and about 95° C. for about 100 minutes;

(d) adding from about 0.1 to about 2.0 mole percent of sulfuric acid to the mixture while maintaining the temperature of the mixture below about 105° C.;

(e) maintaining the temperature of the mixture below about 100° C. for about 60 minutes;

(f) cooling the mixture down to a temperature between about 85° C. and about 90° C. upon addition of from about 1.0 to about 5.0 mole percent of magnesium hydroxide to the mixture over a period of less than about 10 minutes; and (g) maintaining the temperature of the mixture between about 85° C. and about 90° C. for about 20 minutes.

5. A process of making a flocculating adduct adapted for use in purification of liquids, comprising, in the order given, the steps of:

(a) charging a reaction vessel with a mixture of (1) from about 30 to about 45 mole percent of hydrochloric acid having a specific gravity of about 22 baume and (2) from about 25 to about 40 mole percent of hydrochloric acid having a specific gravity of about 20 baume;

(b) heating the mixture, under agitation, to between about 50° C. and about 55° C.;

(c) adding, under agitation, from about 5 to about 12 mole percent aluminum oxide hydrate to the mixture and maintaining the temperature of the mixture between about 90° C. and about 97° C. for about 180 minutes; and (d) adding from about 1.0 to about 5.0 mole percent of zinc oxide to the mixture and maintaining the temperature of the mixture between about 75° C. and about 80° C. for about 30 minutes.

6. A process for making a flocculating adduct adapted for use in purification of liquids, comprising, in the order given, the steps of:

(a) charging a reaction vessel with from about 4 to about 10 moles of 10% aluminum sulfate solution having a pH of from about 1.6 to about 2.2;

(b) adding from about 3 to about 6 moles of 5% sodium metasilicate solution to the aluminum sulfate solution, at a ratio of about one part by weight of sodium metasilicate solution per three parts by weight of aluminum sulfate solution, over a period of about 45 minutes;

(c) adding from about 2 to about 8 moles of ferrous sulfate to the mixture over a period of about 15 minutes while maintaining the pH of the mixture between about 1.0 and about 2.2;

(d) agitating the mixture for about 30 minutes;

(e) adding a mixture of (1) from about 10 to about 50 moles of deionized water and (2) from about 2 to about 12 moles of magnesium chloride to the mixture over a period of about 30 minutes; and (f) continuing agitation of the mixture for about an additional 30 minutes.

7. A process for making a flocculating adduct adapted for use in purification of liquids comprising, in the order given, the steps of:

(e) charging a reaction vessel with from about 50 to about 70 mole percent of nitrosylsulfuric acid;

(b) heating the acid, under agitation, to between about 95° C. and about 100° C.;

(c) adding from about 20 mole percent to about 50 mole percent of technical grade ferrous sulfate to the acid during a period of about 90 minutes;

(d) continuing agitation of the mixture for about 20 minutes;

(e) adding, under agitation, from about 0.02 mole percent to about 10 mole percent of magnesium chloride to the mixture; and (f) continuing agitation of the mixture for about 30 minutes.

8. A process for making a flocculating adduct adapted for use in purification of liquids, comprising, in the order given, the steps of:

(a) charging a reaction vessel with a mixture of (1) from about 0.5 to about 12 mole percent of ferric suflate (2) from about 0.5 to about 12 mole percent of aluminum sulfate and (3) from about 75 to about 115 mole percent of deionized water;

(b) heating the mixture, under agitation, to about 35° C.;

(c) adding from about 0.02 to about 7.0 mole percent of sodium sulfite to the mixture while continuing agitation of the mixture for a period of about 10 minutes;

(d) adding from about 0.02 to about 10 mole percent of a mixture comprising magnesium oxide and calcium carbonate blended together at a mole ratio of about 1:1 over a period of about 120 minutes while maintaining the temperature of the mixture between about 35° C. to about 45° C.;

(e) filtering the mixture;

(f) adding from about 5 to about 20 mole percent of hydrochloric acid, having a specific gravity of about 20 baume, to the filtrate over a period of about 10 minutes while maintaining the temperature of the filtrate below 35° C.; and (g) agitating the filtrate for about 10 minutes while cooling the filtrate down to room temperature.

9. A process for making a flocculating adduct adapted for use in purification of liquids, comprising, in the order given, the step of:

(a) charging a reaction vessel with a mixture of (1) from about 75 mole percent to about 110 mole percent of deionized water and (2) from about 0.2 to about 15 mole percent of polyhydroxyferrosulfate;

(b) heating the mixture, under agitation, to about 35° C.;

(c) adding from about 0.02 to about 7 mole percent of sodium sulfite to the mixture and continuing agitation of the mixture for about 10 minutes;

(d) adding from about 0.5 to about 12 mole percent of calcium chloride to the mixture over a period of about 120 minutes while maintaining the temperature of the mixture between about 35° C. to about 45° C.;

(e) filtering the mixture;

(f) adding from about 5 to about 20 mole percent of hydrochloric acid, having a specific gravity of about 20 baume, to the filtrate over a period of about 10 minutes while maintaining the temperature of the filtrate below about 35° C.; and (g) agitating the filtrate for about 10 minutes while cooling the filtrate down to room temperature.

10. A process for making a flocculating adduct adapted for use in purification of a liquid, comprising, in the order given, the steps of:
 (a) charging a reaction vessel with a mixture of (1) from about 2 to about 20 mole percent of aluminum oxide hydrate, (2) from about 25 to about 50 mole percent of hydrochloric acid having a specific gravity of about 22 baume, (3) from about 0.5 to about 5.0 mole percent of magnesium oxide and (4) from about 30 to about 70 mole percent of deionized water; and
 (b) heating the mixture, under agitation, within a pressure range of from about 10 pounds per square inch to about 120 pounds per square inch, to a temperature of between from about 95° C. to no higher than about 110° C. for a period of from about 90 minutes to about 300 minutes.

11. A process for making a flocculating adduct adapted for use in purification of a liquid, comprising, in the order given, the steps of:
 (a) charging a reaction vessel with a mixture of (1) from about 2 mole percent to about 20 mole percent of aluminum oxide hydrate, (2) from about 0.02 to about 10 mole percent of magnesium hydroxide, (3) from about 10 to about 40 mole percent of hydrochloric acid having a specific gravity of about 20 baume, (4) from about 1 to about 5 mole percent of sulfuric acid and (5) from about 30 to about 70 mole percent of deionized water; and
 (b) heating the mixture, under agitation, within a pressure range of from about 10 pounds per square inch to about 120 pounds per square inch, to a temperature of between from about 95° C. to no higher than about 110° C. for a period of from about 90 minutes to about 300 minutes.

12. The process of claim 3 comprising, in the order given, the steps of:
 (a) charging a reaction vessel with a mixture of (1) 17.29 mole percent of deionized water and (2) 2.80 mole percent of alumunium oxide hydrate;
 (b) heating the mixture, under agitation, to about 45° C.;
 (c) adding about 2.059 mole percent of sulfuric acid to the mixture over a period of about 40 minutes while maintaining the temperature of the mixture below about 110° C.;
 (d) adding (1) about 6.41 mole percent of sulfuric acid and (2) about 16.11 mole percent of deionized water to the mixture and maintaining the temperature of the mixture between about 95° C. and about 110° C. for about 120 minutes; and
 (e) adding about 1.31 mole percent of magnesium hydroxide to the mixture and maintaining the temperature of the mixture between about 85° C. and 95° C. for about 30 minutes.

13. The process of claim 4 comprising, in the order given, the steps of:
 (a) charging a reaction vessel with a mixture of (1) 32.37 mole percent of hydrochloric acid having a specific gravity of about 22 baume and (2) about 29.60 mole percent of hydrochloric acid having a specific gravity of about 20 baume;
 (b) heating the mixture, under agitation, to between about 50° C. and 55° C.;
 (c) adding, under agitation, about 7.86 mole percent of aluminum oxide hydrate to the mixture and maintaining the temperature of the mixture between about 90° C. and 97° C. for about 180 minutes; and
 (d) adding about 3.45 mole percent of magnesium hydroxide to the mixture and maintaining the temperature of the mixture between about 75° C. and 80° C. for about 30 minutes.

14. The process according to claim 5 comprising, in the order given, the steps of:
 (a) charging a reaction vessel with a mixture of (1) 11.5 mole percent of hydrochloric acid having a specific gravity of about 22 baume and (2) about 11.88 mole percent of hydrochloric acid having a specific gravity of about 20 baume;
 (b) heating the mixture, under agitation, to between about 50° C. and about 55° C.;
 (c) adding about 4.68 mole percent of aluminum oxide hydrate to the mixture and maintaining the temperature of the mixture between about 90° C. and about 95° C. for about 100 minutes;
 (d) adding about 0.95 mole percent of sulfuric acid to the mixture while maintaining the temperature of the mixture below about 105° C.;
 (e) maintaining the temperature of the mixture below about 100° C. for about 60 minutes;
 (f) cooling the mixture down to a temperature between about 85° C. and about 90° C. upon addition of about 1.10 mole percent of magnesium hydroxide to the mixture over a period of less than about 10 minutes; and
 (g) maintaining the temperature of the mixture between about 85° C. and about 90° C. for about 20 minutes.

15. The process according to claim 6 comprising, in the order given, the steps of:
 (a) charging a reaction vessel with a mixture of (1) about 32.37 mole percent of hydrochloric acid having a specific gravity of about 22 baume and (2) about 29.60 mole percent of hydrochloric acid having a specific gravity of about 20 baume;
 (b) heating the mixture, under agitation, to between about 50° C. and about 55° C.;
 (c) adding, under agitation, about 7.86 mole percent aluminum oxide hydrate to the mixture and maintaining the temperature of the mixture between about 90° C. and about 97° C. for about 180 minutes; and
 (d) adding about 3.45 mole percent of zinc oxide to the mixture and maintaining the temperature of the mixture between about 75° C. and about 80° C. for about 30 minutes.

16. The process according to claim 7 comprising, in the order given, the steps of:
 (a) charging a reaction vessel with 6.253 moles of 10% aluminum sulfate solution having a pH of from about 1.6 to about 2.2;
 (b) adding about 4.398 moles of 5% sodium metasilicate solution to the aluminum sulfate solution, at a ratio of about one part by weight of sodium metasilicate solution per three parts by weight of aluminum sulfate solution, over a period of about 45 minutes;
 (c) adding about 5.395 moles of ferrous sulfate to the mixture over a period of about 15 minutes while maintaining the pH of the mixture between about 1.0 and about 2.2;
 (d) agitating the mixture for about 30 minutes;
 (e) adding a mixture of (1) about 19.44 moles of deionized water and (2) about 10.08 moles of magnesium chloride to the mixture over a period of about 30 minutes; and (f) continuing agitation of the mixture for about an additional 30 minutes.

17. The process according to claim 8 comprising, in the order given, the steps of:
   (a) charging a reaction vessel with about 56.89 mole percent of nitrosylsulfuric acid;
   (b) heating the acid, under agitation, to between about 95° C. and about 100° C.;
   (c) adding about 31.78 mole percent of technical grade ferrous sulfate to the acid during a period of about 90 minutes;
   (d) continuing agitation of the mixture for about 20 minutes;
   (e) adding, under agitation, about 7.55 mole percent of magnesium chloride to the mixture; and
   (f) continuing agitation of the mixture for about 30 minutes.

18. The process according to claim 9 comprising, in the order given, the steps of:
   (a) charging a reaction vessel with a mixture of (1) about 1.23 mole percent of ferric sufate (2) about 1.30 mole percent of aluminum sulfate and (3) about 87.63 mole percent of deionized water;
   (b) heating the mixture, under agitation, to about 35° C.;
   (c) adding about 0.440 mole percent of sodium sulfite to the mixture while continuing agitation of the mixture for a period of about 10 minutes;
   (d) adding about 3.11 mole percent of a mixture comprising magnesium oxide and calcium carbonate blended together at a mole ratio of about 1:1 over a period of about 120 minutes while maintaining the temperature of the mixture between about 35° C. to about 45° C.;
   (e) filtering the mixture;
   (f) adding about 6.29 mole percent of hydrochloric acid, having a specific gravity of about 20 baume, to the filtrate over a period of about 10 minutes while maintaining the temperature of the filtrate below 35° C.; and
   (g) continuing agitation the filtrate for an additional 10 minutes while cooling the filtrate down to room temperature.

19. The process according to claim 10 comprising, in the order given, the step of:
   (a) charging a reaction vessel with a mixture of (1) about 84.01 mole percent of deionized water and
   (2) about 2.60 mole percent of polyhydroxyferrosulfate;
   (b) heating the mixture, under agitation, to about 35° C.;
   (c) adding about 0.440 mole percent of sodium sulfite to the mixture and continuing agitation of the mixture for about 10 10 minutes;
   (d) adding about 6.66 mole percent of calcium chloride to the mixture over a period of about 120 minutes while maintaining the temperature of the mixture between about 35° C. to about 45° C.;
   (e) filtering the mixture;
   (f) adding about 6.29 mole percent of hydrochloric acid, having a specific gravity of about 20 baume, to the filtrate over a period of about 10 minutes while maintaining the temperature of the filtrate below about 35° C.; and
   (g) agitating the filtrate for about 10 minutes while cooling the filtrate down to room temperature.

20. The process according to claim 11 comprising, in the order given, the steps of:
   (a) charging a reaction vessel with a mixture of (1) about 8.39 mole percent of aluminum oxide hydrate, (2) about 37.45 mole percent of hydrochloric acid having a specific gravity of about 22 baume, (3) about 4.66 mole percent of magnesium oxide and (4) about 49.50 mole percent of deionized water; and
   (b) heating the mixture, under agitation, while increasing the pressure to about 65 pounds per square inch, to a temperature of between about 95° C. to no higher than about 110° C. for a period of about 90 minutes.

21. The process according to claim 12 comprising, in the order given, the steps of:
   (a) charging a reaction vessel with a mixture of (1) about 15.34 mole percent of aluminum oxide hydrate, (2) about 3.24 mole percent of magnesium hydroxide, (3) about 16.74 mole percent of hydrochloric acid having a specific gravity of about 20 baume, (4) about 1.93 mole percent of sulfuric acid and (5) about 62.75 mole percent of deionized water; and
   (b) heating the mixture, under agitation, while raising the pressure to about 65 pounds per square inch, to a temperature of between about 95° C. to no higher than about 100° C. for a period of about 90 minutes.

* * * * *